United States Patent
Henck

(10) Patent No.: US 11,156,439 B2
(45) Date of Patent: Oct. 26, 2021

(54) ACTUATOR ASSEMBLIES AND METHODS OF ASSEMBLING THE SAME

(71) Applicant: Joyson Safety Systems Acquisition LLC, Auburn Hills, MI (US)

(72) Inventor: Jeremy Henck, White Lake, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 141 days.

(21) Appl. No.: 16/269,414

(22) Filed: Feb. 6, 2019

(65) Prior Publication Data

US 2019/0241352 A1    Aug. 8, 2019

Related U.S. Application Data

(60) Provisional application No. 62/627,141, filed on Feb. 6, 2018.

(51) Int. Cl.
| | |
|---|---|
| *B60R 21/26* | (2011.01) |
| *F42B 3/10* | (2006.01) |
| *F42B 3/26* | (2006.01) |

(52) U.S. Cl.
CPC ............ *F42B 3/10* (2013.01); *B60R 21/26* (2013.01); *F42B 3/26* (2013.01); *B60R 2021/26029* (2013.01); *B60R 2021/26041* (2013.01)

(58) Field of Classification Search
CPC .............. B60R 21/26; B60R 21/017; B60R 2021/26041; B60R 2021/26029; F42B 3/26; F42B 3/10; F42B 3/103; F42B 3/04
See application file for complete search history.

(56) References Cited

U.S. PATENT DOCUMENTS

| 4,801,033 A | 1/1989 | Kanner |
| 5,288,242 A * | 2/1994 | Muzslay ............ H01R 13/6277 |
| | | 439/349 |

(Continued)

FOREIGN PATENT DOCUMENTS

| CN | 206407339 | 8/2017 |
| KR | 100789491 | 12/2007 |
| KR | 200449212 | 6/2010 |

OTHER PUBLICATIONS

International Search Report and Written Opinion, dated May 22, 2019, in connection with International Application No. PCT/US2019/016913.

(Continued)

*Primary Examiner* — Frank B Vanaman
(74) *Attorney, Agent, or Firm* — Meunier Carlin & Curfman LLC

(57) ABSTRACT

Various implementations include a self-coupling initiator including one or more integrated features that allow the initiator to be installed within a housing tube without a forming or fastening operation. The integrated features are able to be coupled to a drop protection cap. The drop protection cap extends around at least a portion of a head portion of the initiator and abuts the structure of the outer housing so that force imparted on the drop protection cap from a drop test is transferred to a direct compression load on the cap and housing, instead of the force being transferred to the initiator. In addition, the initiator may include one or more clip features that allow the initiator to clip into the housing. In such embodiments, the drop protection cap may also prevent the clips from being disengaged with the housing.

20 Claims, 15 Drawing Sheets

(56) References Cited

U.S. PATENT DOCUMENTS

| | | | | |
|---|---|---|---|---|
| 5,616,045 | A | * | 4/1997 | Gauker ................ B60R 21/017 439/352 |
| 5,955,699 | A | * | 9/1999 | Perotto ............... B60R 21/2644 102/530 |
| 6,718,884 | B1 | * | 4/2004 | Yabuta .................... F42B 3/103 102/202.14 |
| 7,077,428 | B2 | | 7/2006 | Barker et al. |
| 8,083,259 | B2 | | 12/2011 | Schönhuber et al. |
| 9,133,984 | B2 | | 9/2015 | Cappeller et al. |
| 9,206,089 | B2 | | 12/2015 | Inuzuka et al. |
| 2002/0025708 | A1 | * | 2/2002 | Wakui ................ H01R 13/7032 439/188 |
| 2004/0097116 | A1 | * | 5/2004 | Osada ..................... B60R 21/26 439/188 |
| 2006/0150855 | A1 | * | 7/2006 | Maruyama .............. F42B 3/103 102/202.14 |
| 2009/0293752 | A1 | * | 12/2009 | Jordan ..................... F42B 3/10 102/202.14 |
| 2014/0033939 | A1 | * | 2/2014 | Priess ..................... F42B 3/182 102/333 |
| 2018/0222437 | A1 | * | 8/2018 | Tokuda ................ B60R 21/263 |

OTHER PUBLICATIONS

International Preliminary Report on Patentability, dated Aug. 20, 2020, in connection to International Application No. PCT/US2019/016913.

* cited by examiner

ACTUATOR ASSEMBLIES AND METHODS OF ASSEMBLING THE SAME

CROSS REFERENCE TO RELATED APPLICATIONS

This application claims priority to U.S. Provisional Patent Application No. 62/627,141, entitled "Self-Coupling Initiator Assemblies and Methods of Using the Same," filed Feb. 6, 2018, the content of which is incorporated by reference herein in its entirety.

BACKGROUND

Currently, initiators (e.g., micro gas generators (MGGs)) are crimped into housing tubes (e.g., used with seatbelt pre-tensioners or hood lifters) using a spin forming or crimping machines. Other initiators may include threaded caps that secure the initiator into the tube. These installation options are time consuming.

In addition, initiators being shipped from a manufacturer to another facility for installing the initiator into a tube may be required to have a drop protection cap disposed around electrical connectors (e.g., wires) of the initiator to protect the electrical connectors in case the initiator is dropped accidentally or during a drop test. The drop protection cap is coupled to the outside of the tube.

Thus, there is a need in the art for an improved initiator that allows for easier installation and improved devices for protecting the initiator against dropping.

BRIEF SUMMARY

Various implementations include an actuator assembly that includes a housing, an initiator, and a cap. The housing has an end wall, and the end wall defines an opening. The initiator includes a head portion, and the head portion defines at least one groove that extends circumferentially around at least a portion of the head portion. The cap has an end face, a wall that extends from the end face in a first axial direction, a first arm, and a second arm. Each arm has a proximal end coupled to the wall and a distal end that is free and spaced apart from the proximal end. The arms are biased radially inward. At least a portion of the arms slidably engage the at least one groove defined by the head portion, and a portion of the head portion extending axially outside of the housing is disposed within a cavity defined by the end face and wall of the cap.

In some implementations, the at least one groove comprises a first groove and a second groove. The first and second grooves are diametrically opposed to each other on the head portion. For example, in a further implementation, the first groove defines a first step within the first groove and the second groove defines a second step within the second groove. The steps are spaced apart from each other circumferentially. A distal end of each arm comprises a clip surface that extends radially inwardly. The clip surface of the first arm engages the first step, and the clip surface of the second arm engages the second step, preventing the arms from being slidably disengaged from the grooves.

In some implementations, the arms extend circumferentially from the wall of the cap such that the proximal and distal ends of each arm are circumferentially spaced apart, and the first and second arms are circumferentially spaced apart. In a further implementation, a depth of each arm tapers adjacent a distal end thereof. The depth is measured in an axial direction. And, the arms pull the initiator axially toward the end wall of the housing to compress a resilient seal disposed between a flange of the initiator and the end wall when the arms are slid through the at least one groove.

In some implementations, the arms extend axially from the wall of the cap such that the proximal and distal ends of each arm are axially spaced apart, and the first and second arms are circumferentially spaced apart. In further implementations, the head portion of the initiator comprises a head face and a head wall that extends axially from the head face. The at least one groove is defined in the head wall. The head portion further comprises at least two initiator arms, and each initiator arm has a proximal end coupled to the head wall and a distal end that is free and radially spaced apart from the head wall. The proximal ends of each initiator arm are axially spaced apart from the head face. The initiator arms are biased radially outwardly. The proximal ends of the initiator arms are spaced apart from each other. The one or more grooves extend circumferentially between the proximal ends of the initiator arms. And, the distal end of each initiator arm comprises a clip surface that extends radially outwardly from each initiator arm. The clip surfaces extend through the opening of the housing and engage the end wall of the housing. In another further implementation, the cap further comprises at least one inner tab that is spaced radially inwardly from the wall of the cap, and a distal end of each inner tab extends into a space defined between the head wall of the initiator and a respective initiator arm to prevent radially inward movement of the initiator arms. In another further implementation, the at least two initiator arms comprise first, second, and third initiator arms that are spaced apart circumferentially. In another further implementation, the end face of the cap defines an opening through which one or more electrical connectors extend from the initiator and through the opening of the cap. And, in another further implementation, the wall of the cap defines an opening through which one or more electrical connectors extend from the initiator and through the opening of the cap.

In some implementations, the at least one groove has a groove floor, each arm of the cap has an inner radial surface, and at least a portion of the inner radial surface engages the groove floor of the at least one groove. In further implementations, the at least one groove has a first sidewall and a second sidewall that extends radially outwardly from the groove floor. The first and second sidewalls face each other axially. And in a further implementation, the first sidewall is disposed outside of the housing and the second sidewall is disposed inside of the housing.

In some implementations, the wall of the cap defines an opening, and one or more electrical connectors extend from the initiator and through the opening of the cap.

In some implementations, an axial end surface of the wall of the cap abuts the end wall of the housing when the arms are engaged in the grooves.

Various other implementations include a method of assembling an actuator. The method comprises: (1) sliding an initiator through a first opening of a housing and toward a second opening of the housing, the first opening and the second opening being axially spaced apart, the initiator comprising a head portion defining at least one groove that extends circumferentially around at least a portion of the head portion, wherein at least a portion of the head portion extends through the second opening of the housing; and (2) sliding first and second arms of a cap into the at least one groove of the initiator, the cap having an end face, a wall that extends from the end face in a first axial direction, wherein each arm has a proximal end coupled to the wall and a distal end that is free and spaced apart from the proximal end, the arms being biased radially inwardly, wherein the portion of the head portion of the initiator that extends axially outside of the housing is disposed within a cavity defined by the end face and wall of the cap.

In some implementations, the method further comprises extending one or more electrical connectors that extend from the head portion of the initiator through an opening defined by the cap.

In some implementations, the arms extend circumferentially from the wall of the cap such that the proximal and distal ends of each arm are circumferentially spaced apart, and the first and second arms are circumferentially spaced apart.

In some implementations, the arms extend axially from the wall of the cap such that the proximal and distal ends of each arm are axially spaced apart, and the first and second arms are circumferentially spaced apart.

BRIEF DESCRIPTION OF THE DRAWINGS

Example features and implementations are disclosed in the accompanying drawings. However, the present disclosure is not limited to the precise arrangements and instrumentalities shown.

DETAILED DESCRIPTION

Figure 1:
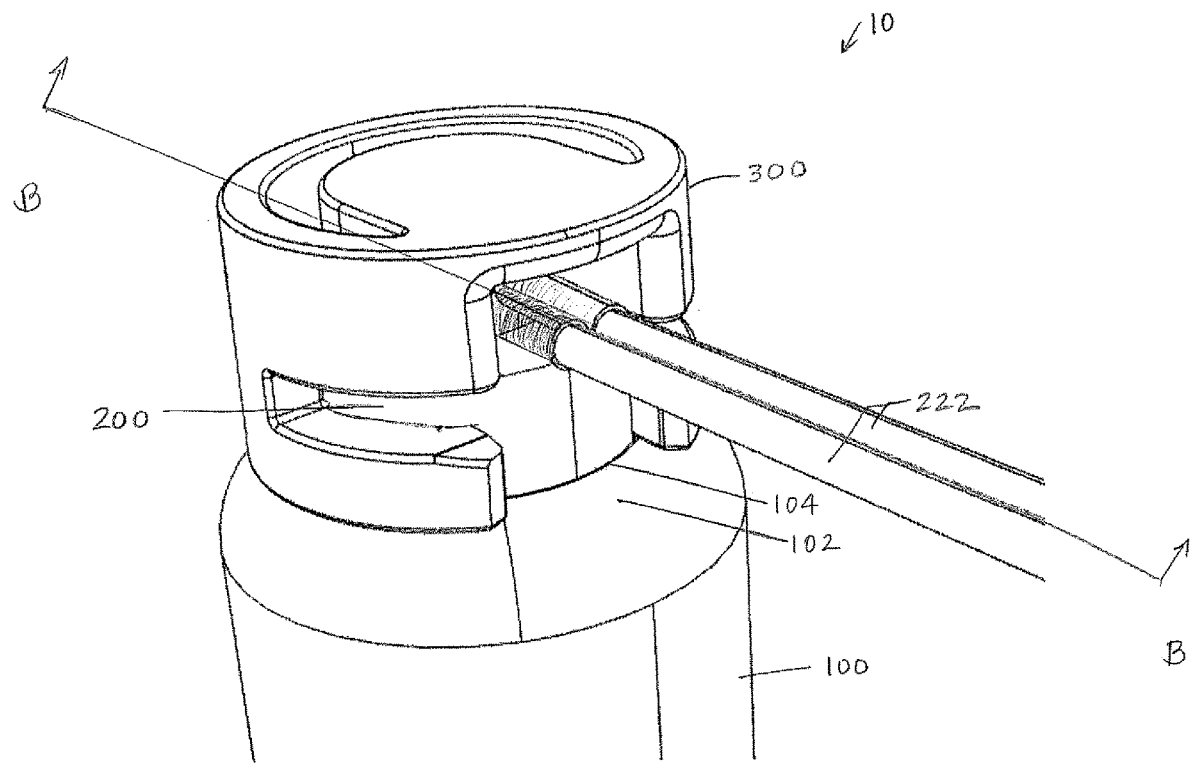
FIG. 1 illustrates a partial perspective view of an actuator assembly having a cap that is slidably engaged with an initiator and housing according to one implementation. In this implementation, the cap is slidable in a radial direction.
Figure 3:
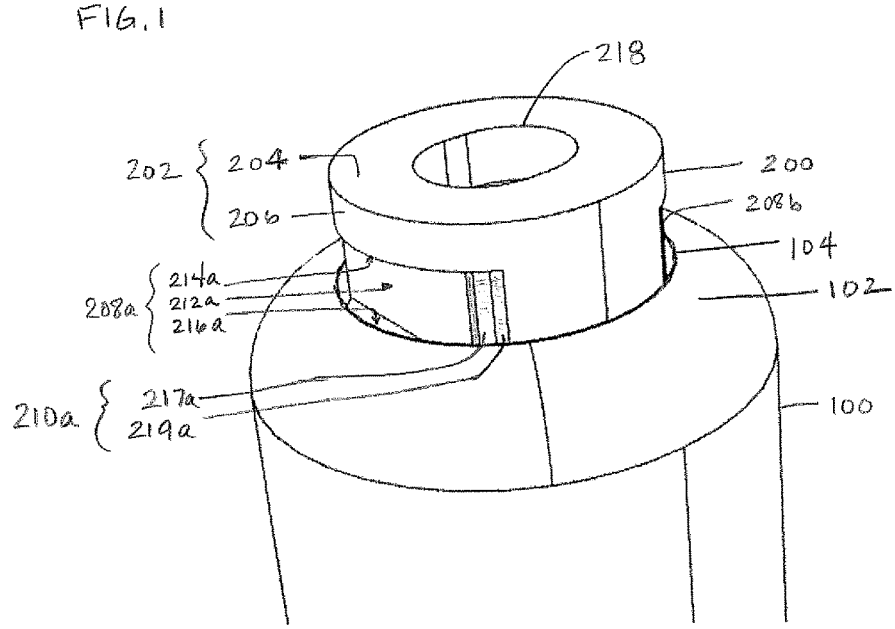
FIG. 3 illustrates a partial perspective view of the initiator and housing shown in FIG. 1.

In various implementations, a self-coupling initiator includes one or more integrated features that allow the initiator to be installed within a housing tube without a forming or fastening operation. For example, in some implementations, the integrated features are able to be coupled to a drop protection cap. The drop protection cap extends around at least a portion of a head portion of the initiator and abuts the structure of the outer housing so that force imparted on the drop protection cap from a drop test is transferred to a direct compression load on the cap and housing, instead of the force being transferred to the initiator.

In addition, in some implementations, the initiator may include one or more snap features that allow the initiator to snap into the housing. In such embodiments, the drop protection cap may also prevent the snaps from being disengaged with the housing. If the drop protection cap is not needed or if a lower profile locking cap is desired, a locking cap may be provided that prevents the snaps from flexing and unsecuring the initiator.

FIGS. 1-7 illustrate an implementation of an actuator assembly 10 that includes a housing 100 (e.g., such as a tube or cylinder), a self-coupling initiator 200, and a drop protection cap 300. The housing 100 includes an end wall 102 at a proximal end of the housing 100, and the end wall defines an opening 104. A distal end opening is also defined at a distal end of the housing 100 axially opposite end wall 102, which is not shown. A piston rod or other actuatable structure may be pushed out of the distal end opening upon initiation of the initiator 200.

Figure 2:
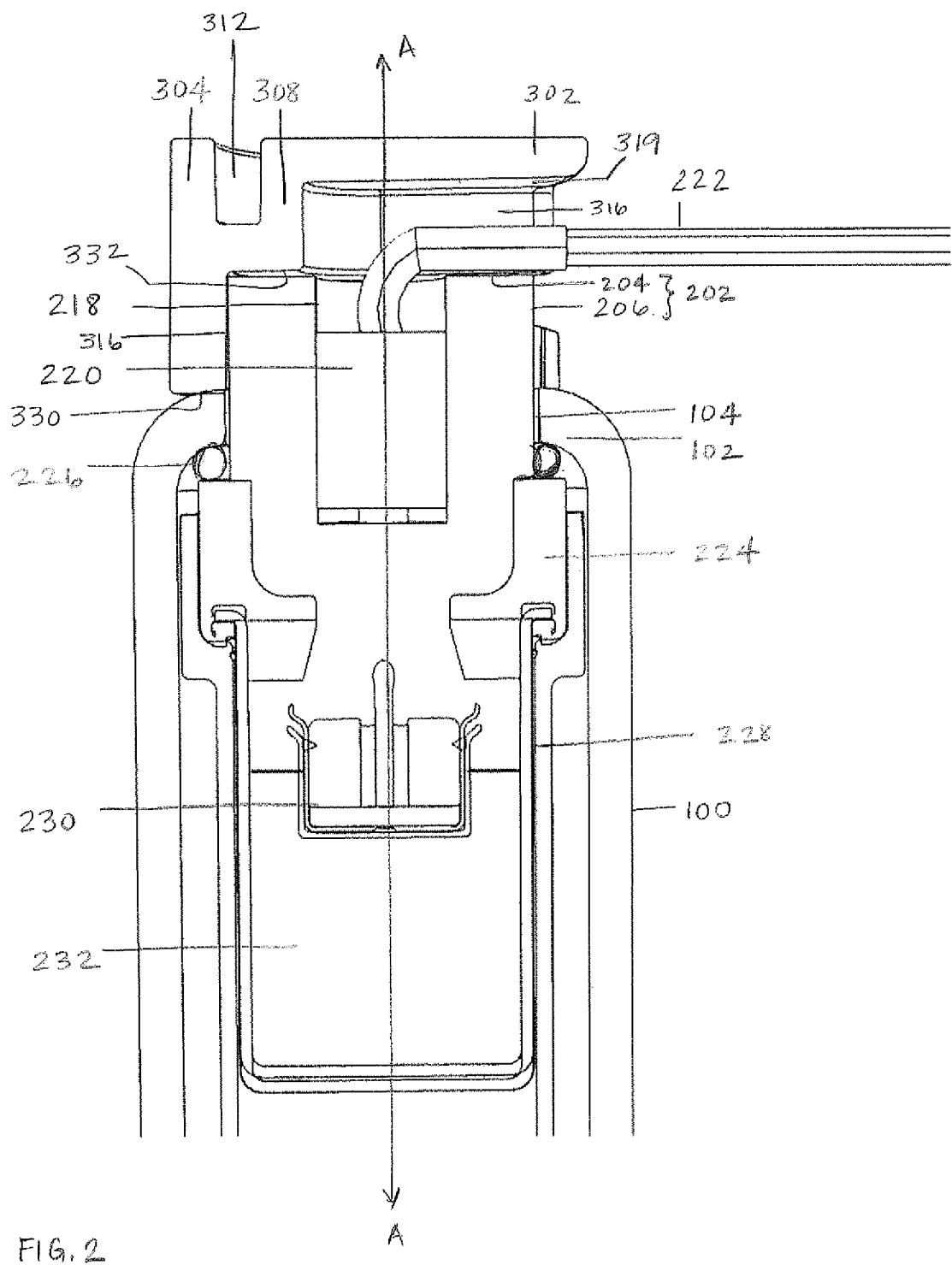
FIG. 2 illustrates a partial cross sectional view of the actuator assembly shown in FIG. 1 as viewed from the B-B plane.
Figure 4:
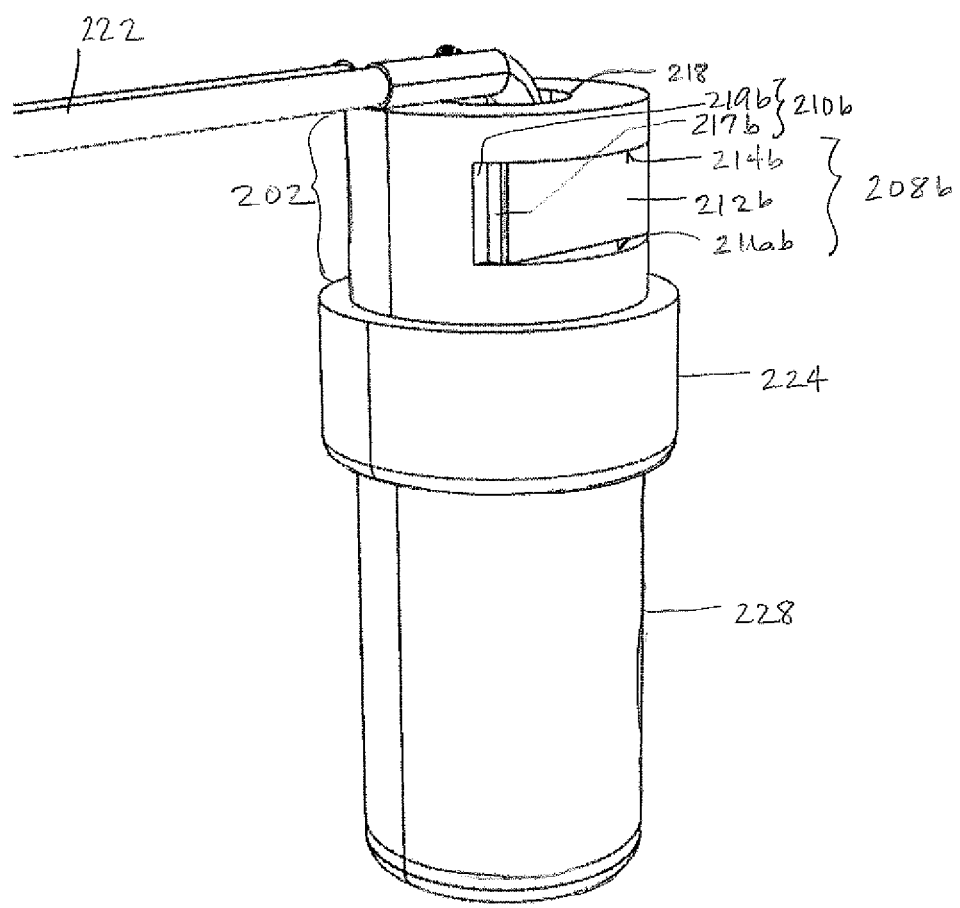
FIG. 4 illustrates a perspective view of the initiator shown in FIG. 1.
Figure 5:
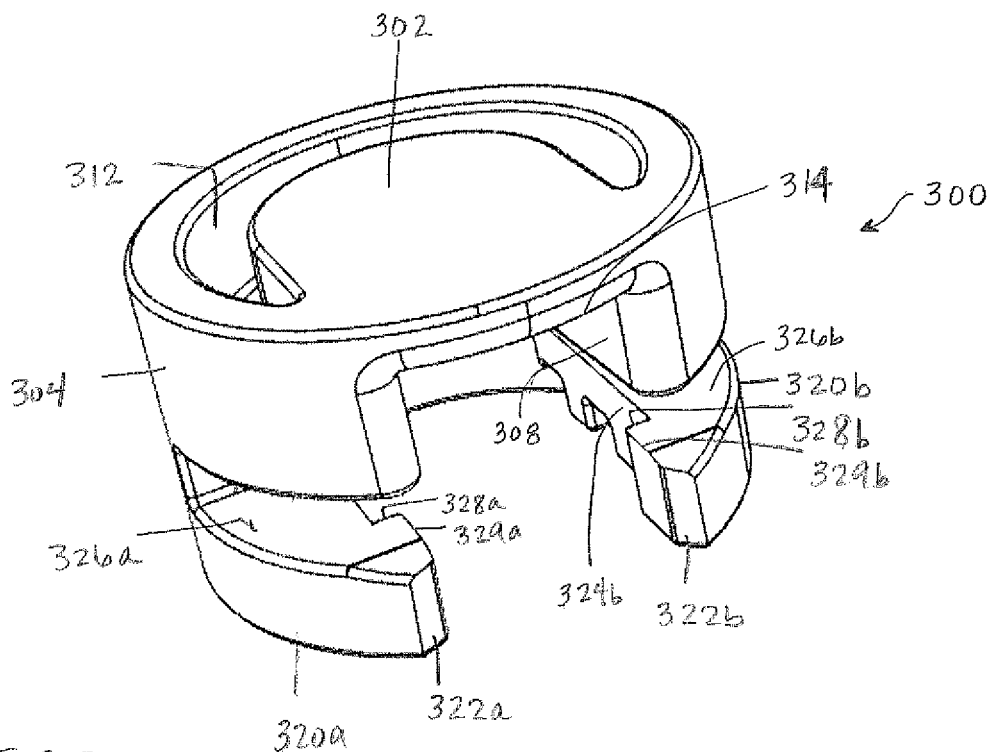
FIGS. 5 and 6 illustrate perspective views of the cap shown in FIG. 1.

The self-coupling initiator 200 can be a micro-gas generator (MGG), for example. As shown in FIG. 2, the intiator 200 includes a head portion 202, ferrite 220 (optionally included), electrical connectors 222 (e.g., wires), a collar 224, a resilient seal 226, a housing 228, an initiator head 230 disposed within the housing 228, and a propellant cavity 232. The housing 228 (e.g., an aluminum housing) defines the propellant cavity 232 into which propellant is disposed. The initiator head 230 is also disposed within the housing 228 axially adjacent and in communication with the propellant cavity 232. The electrical connectors 222 are coupled to the initiator head 230. The collar 224 (e.g., an aluminum collar) is disposed adjacent the opening of the housing 228 and is coupled thereto (e.g., by crimping or other suitable fastening mechanisms). The head portion 202, which may be formed from injection molding a resin material into a mold that is in communication with the collar 224, extends around a portion of the initiator head 230, between the collar 224, and around the ferrite 220 through which the electrical connectors 222 extend. The resilient seal 226 (e.g., an rubber o-ring) is disposed axially adjacent the collar 224 and radially adjacent an outer radial surface of the head portion 202. When the initiator 200 is assembled within the housing 100 with the cap 300, the resilient seal 226 is compressed between the collar 224 and the end wall 102 of the housing 100 to prevent combustion gases from the initiator 200 from leaving the housing 100 through the opening 104.

The head portion 202 includes a head face 204 and a head wall 206. As further shown in FIG. 3, the head face 204 defines a cavity 218 that extends axially from the head face 204. The ferrite 220 is disposed within the cavity 218, and electrical connectors 222 extend from the initiator head 230, through the ferrite 220, and out of the cavity 218. In this implementation, the head portion 202 is generally cylindrically shaped.

The head wall 206 extends axially from a perimeter of the head face 204. The head wall 206 defines first and second grooves 208a, 208b that are diametrically opposed from each other. Ends of the grooves 208a, 208b are spaced apart from each other circumferentially around the head wall 206. The grooves 208a, 208b each have a groove floor 212a, 212b, an outer groove sidewall 214a, 214b, and an inner groove sidewall 216a, 216b, respectively. The outer groove sidewalls 214a, 214b are axially closer to the head face 204 than the inner groove sidewalls 216, 216b and are axially spaced apart from each other. The groove floors 212a, 212b extend between the sidewalls 214a, 216a and 214b, 216b, respectively, and lie within parallel planes that are also parallel to a central axis A-A extending through the self-coupling initiator 200. However, in other implementations, the groove floors may be arcuate shaped or at least partially arcuate shaped. In addition, in other implementations, the groove may extend 360° around the head wall 206.

The grooves 208a, 208b and head wall 206 also define steps 210a, 210b at ends of each groove 208a, 208b. The steps 210a, 210b are circumferentially spaced apart from and are adjacent to each other. Each step 210a, 210b includes a first surface 217a, 217b that extends circumferentially from and radially inward from the groove floor 212a, 212b and a second surface 219a, 219b that extends between the first surfaces 217a, 217b and the head wall 206.

The drop protection cap 300 includes an end face 302, an outer wall 304, an inner wall 308, and arms 320a, 320b. The outer wall 304 extends from an outer perimeter (e.g., circumference) of the end face 302. The inner wall 308 extends from the end face 302 and is spaced radially inwardly from the outer wall 304. The outer wall 304 includes an axial end surface 330, and the inner wall 308 includes an axial end surface 332. The axial end surfaces 330, 332 are axially spaced apart from each other and a plane that includes the end face 302. Axial end surface 332 couples the inner wall 308 with the outer wall 304. The outer wall 304 and the inner wall 308 define a channel 312 that extends axially into the end face 302. In the implementation shown, the channel 312 is crescent shaped. The channel 312 reduces the amount of material used to form the cap 300 and prevents warping of the cap 300 during and/or after molding by providing less variation in the volume of various portions of the cap 300.

The arms 320a, 320b extend circumferentially from the outer wall 304. Distal ends 322a, 322b of the arms 320a, 320b are spaced apart circumferentially. The distal end 322a, 322b of each arm 320a, 320b includes a clip surface 328a, 328b and a facing surface 329a, 329b. The clip surface 328a, 328b extends from the radially inward facing surface 324a, 324b in a radial inward direction, and the facing surface 329a, 329b extends from the clip surface 328a, 328b and is disposed between the clip surface 328a, 328b and the distal ends 322a, 322b. The facing surfaces 329a, 329b each lie in planes that are parallel to each other. The planes that include the facing surfaces 329a, 329b intersect a plane that includes the clip surfaces 328a, 328b at an angle of between 0° and 180° (e.g., 90°). Each arm 320a, 320b further includes a first surface 326a, 326b facing a first axial direction and a second surface 327a, 327b facing a second axial direction, wherein the first and second axial directions are opposite each other.

Figure 8:
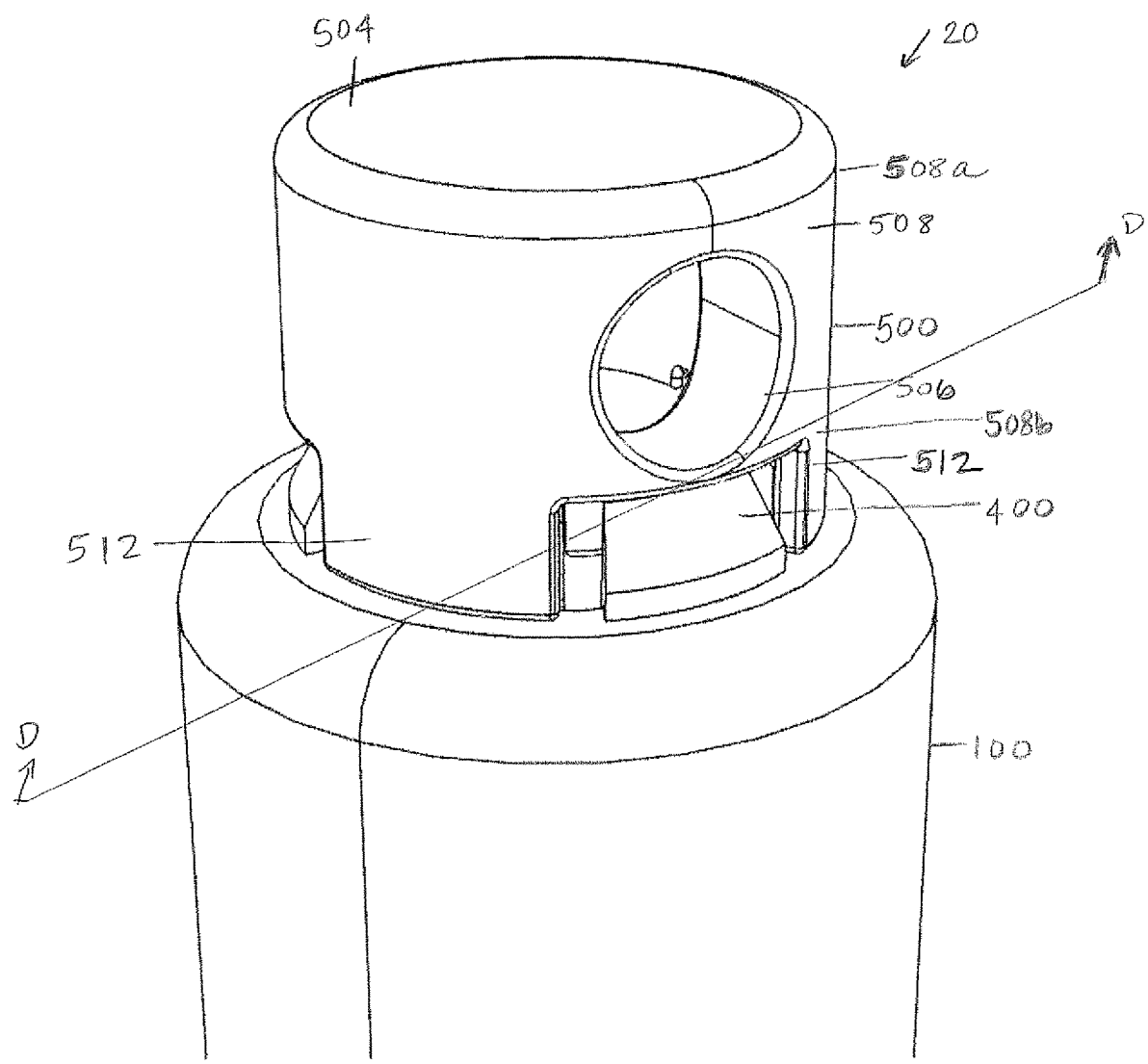
FIG. 8 illustrates a partial perspective view of the housing shown in FIG. 1 assembled with an initiator and a cap according to another implementation.

In addition, the outer wall 304, the inner wall 308, and the distal ends 322a, 322b of the arms 320a, 320b define an opening 314. The opening 314 is in communication with a cavity defined by a radially inward facing surface 316 of the inner wall 308, an axially inward facing surface 319 of the end face 302, and radially inward facing surfaces 324a, 324b of the arms 320a, 320b. The opening 314 is U-shaped, but the opening may have other suitable open or closed shapes, such as the circular opening shown in FIG. 8.

Figure 6:
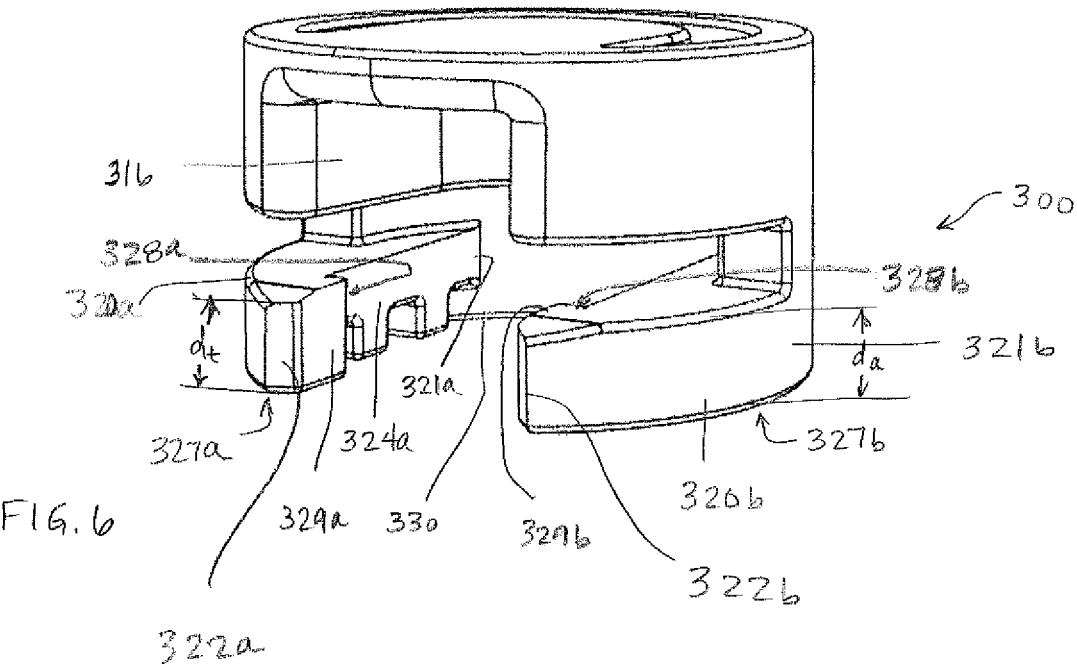
Figure 7:
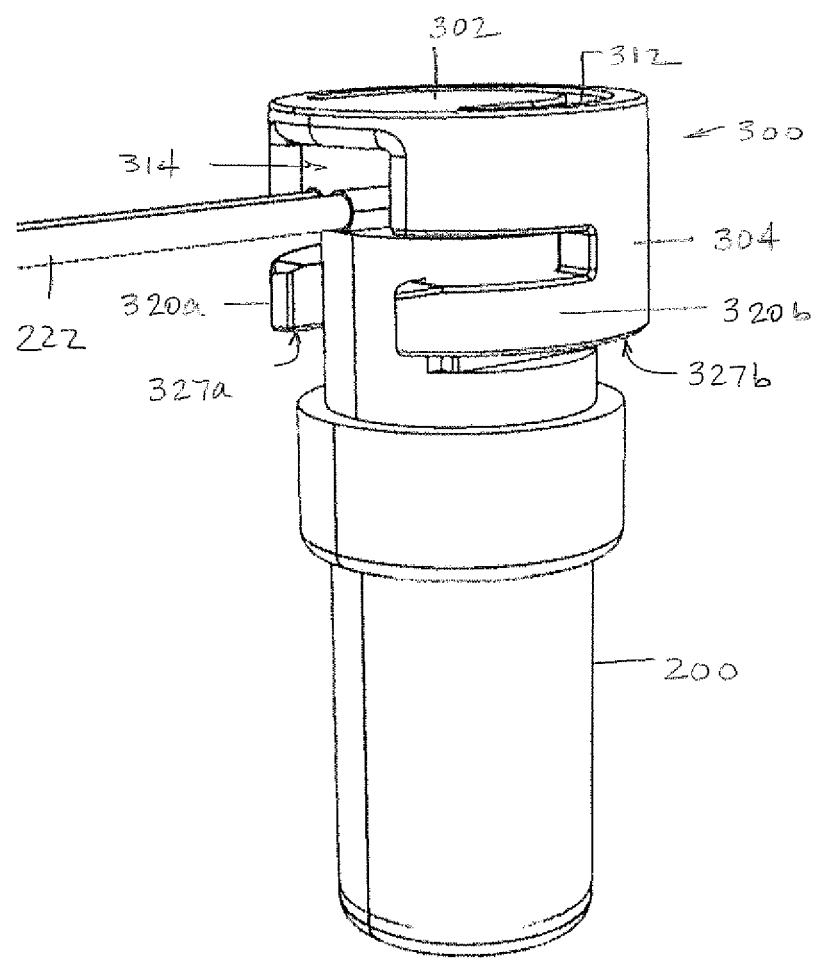
FIG. 7 illustrates a perspective view of the cap and initiator shown in FIG. 1.

Furthermore, a depth of each arm 320a, 320b tapers at the distal end 322a, 322b of the arm 320a, 320b. The depth of each arm 320a, 320b is measured in the axial direction between first surface 326a, 326b and second surface 327a, 327b, respectively. As shown in FIG. 6, the second surface 327a, 327b lies in the same plane from a proximal end 321a, 321b to the distal end 322a, 322b of the respective arm 320a, 320b. However, the first surface 326a, 326b begins to taper toward the second surface 327a, 327b between the clip surface 328a, 328b and the distal end 322a, 322b, respectively, such that the depth $d_a$ at the proximal end 321a, 321b is greater than the depth $d_t$ at the distal end 322a, 322b.

To assemble the cap 300, the initiator 200, and housing 100, the head face 204 of the initiator 200 is inserted through the distal end opening in the housing 100 (not shown). The initiator 200 is slid axially through the housing 100 until the head face 204 and a portion of the head wall 206 extend through the opening 104 of the housing 100. The outer diameter of the head wall 206 is less than an inner diameter of the opening 104 to allow the head wall 206 to pass through the opening 104. However, the outer diameter of the collar 224 is greater than the inner diameter of the opening 104 and prevents the initiator 200 from passing fully through the opening 104.

When the inititiator 200 is slid toward the opening 104, the seal 226 is not compressed, and the axial distance between the first sidewall 214a, 214b of each groove 208a, 208b of the initiator 200 and the end wall 102 is less than depth $d_a$ of the arms 320a, 320b. However, the depth $d_t$ of the tapered portion of each arm 320a, 320b adjacent the distal end 322a, 322b fits within the space between the first sidewall 214a, 214b of each groove 208a, 208b and the end wall 102. As the arms 320a, 320b are slid in a radial direction relative to the initiator 200, the initiator 200 is pulled axially toward the end wall 102 and the cap 300 by the portions of the arms 320a, 320b that are proximal to the tapered portion engaging the sidewalls 314a, 314b, which compresses the seal 226 between the end wall 102 and the collar 224.

The arms 320a, 320b of the cap 300 are slid into the grooves 208a, 208b, respectively, of the head portion 202 until the clip surface 328a, 328b of the arms 320a, 320b engages the first surface 217a, 217b of the step 210a, 210b, respectively. The arms 320a, 320b are slid in a radial direction relative to the initiator 200.

Facing surfaces 329a, 329b engage the second surface 219a, 219b of the step 210a, 210b, respectively. The first surfaces 326a, 326b of the arms 320a, 320b face respective sidewalls 214a, 214b of the grooves 208a, 208b, and the second surfaces 327a, 327b of the arms 320a, 320b face the respective sidewalls 216a, 216b of the grooves 208a, 208b and the end wall 102 of the housing 100. The inner radial surfaces 324a, 324b of each arm 320a, 320b that extends between the respective first surface 326a, 326b and second surfaces 327a, 327b engages the groove floor 212a, 212b of the respective groove 208a, 208b. And, an axial end surface of each arm 320a, 320b and the inner radial surface 324a, 324b of each arm 320a, 320b define one or more channels that extend into these surfaces of the arm a direction that is perpendicular to a plane that includes the inner radial surface of each arm 320a, 320b. The second surfaces 327a, 327b of each arm 320a, 320b abut the end wall 102 of the housing 100. The axial end surface 330 of the outer wall 304 of the cap 300 also abuts the end wall 102 of the housing 100. Furthermore, the electrical connectors 222 of the initiator 200 are extended through the opening 314 defined by the cap 300. By coupling the cap 300 with the initiator 200, the initiator 200 is secured axially in place within the opening 104 of the housing 100 since the arms 320a, 320b of the cap 300 extend between the grooves 208a, 208b of the initiator 200 and the end wall 102 of the housing 100. And, any forces received by the cap 300 are transferred to the end wall 102 of the housing 100 and not to the initiator 200, which prevents damage to the electrical connectors 222.

In the implementation shown in FIGS. 1-7, the outer wall 304 extends from an outer perimeter of the end face 302, and the cap is generally cylindrically shaped. However, in other implementations, the cap may have other suitable shapes, such as dome shaped (e.g., the end face is the distal tip of the dome shaped cap, and the cap wall extends from the tip).

FIGS. 8-21 illustrate other implementations of actuator assemblies. In these implementations, the initiator has integrated clip features for securing the initiator within the opening of the housing defined by the end wall. These implementations also include a cap for slidably engaging the initiator, but the cap slides in an axial direction instead of the radial sliding direction of the cap 300 described above with respect to FIGS. 1-7.

For example, FIGS. 8-13 illustrate an assembly 20 according to one such implementation. The initiator 400 shown is a micro-gas generator (MGG), similar to the initiator 200 described above, and has a head portion 402 from which electrical connectors 422 (e.g., wires) extend. The head portion 402 comprises a head face 404 from which the electrical connectors 422 extend and at least one head wall 406 that extends axially from a perimeter of the head face 404.

Figure 21:
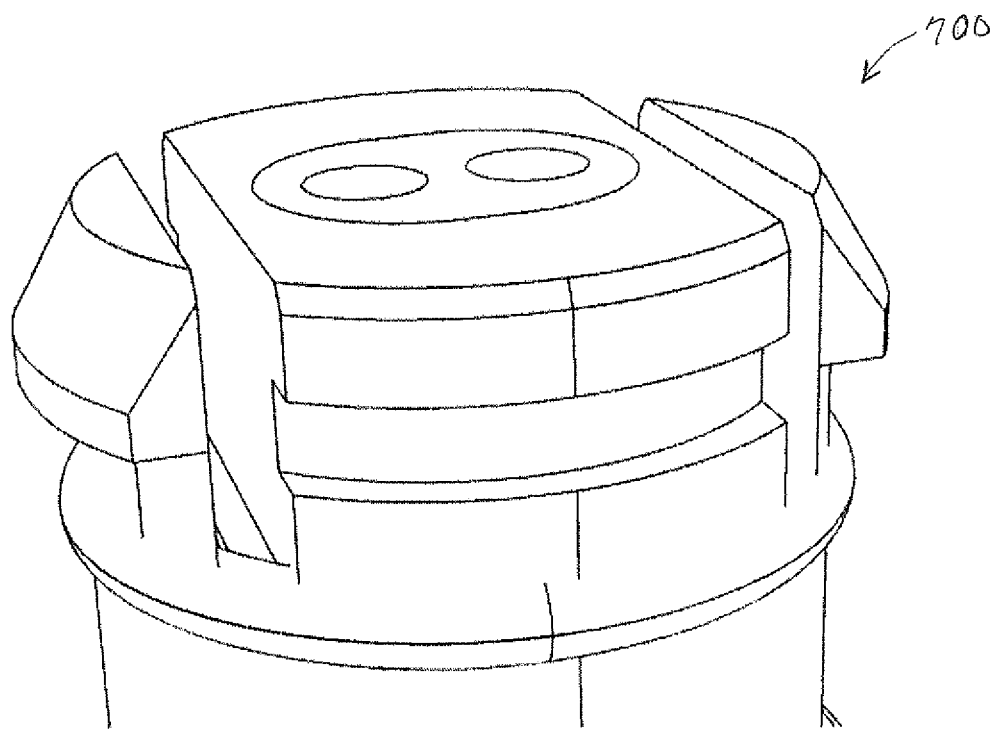
FIG. 21 illustrates a partial perspective view of the initiator shown in FIG. 19.
Figure 20:
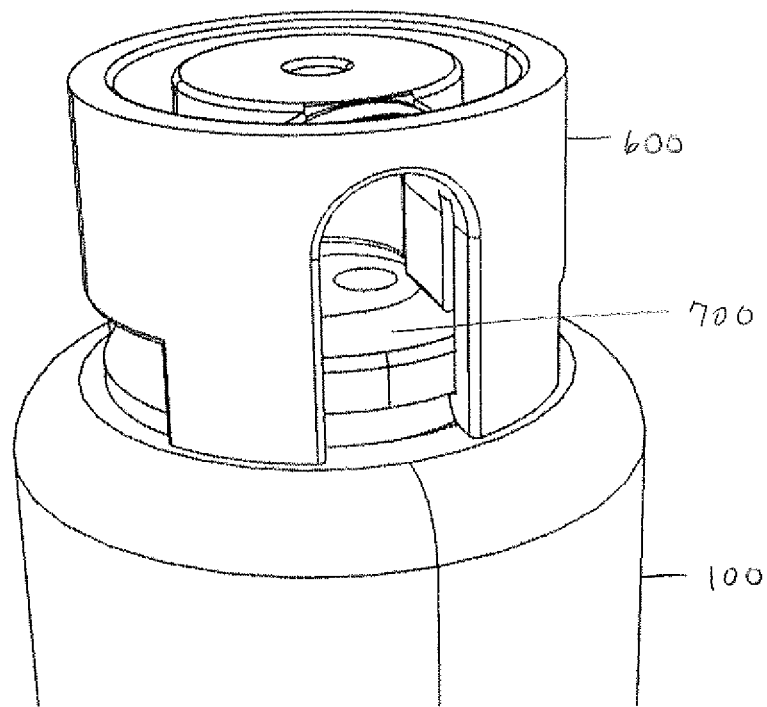
FIG. 20 illustrates a partial perspective view of the cap in FIGS. 14-16 assembled with the housing and initiator shown in FIG. 19.
Figure 19:
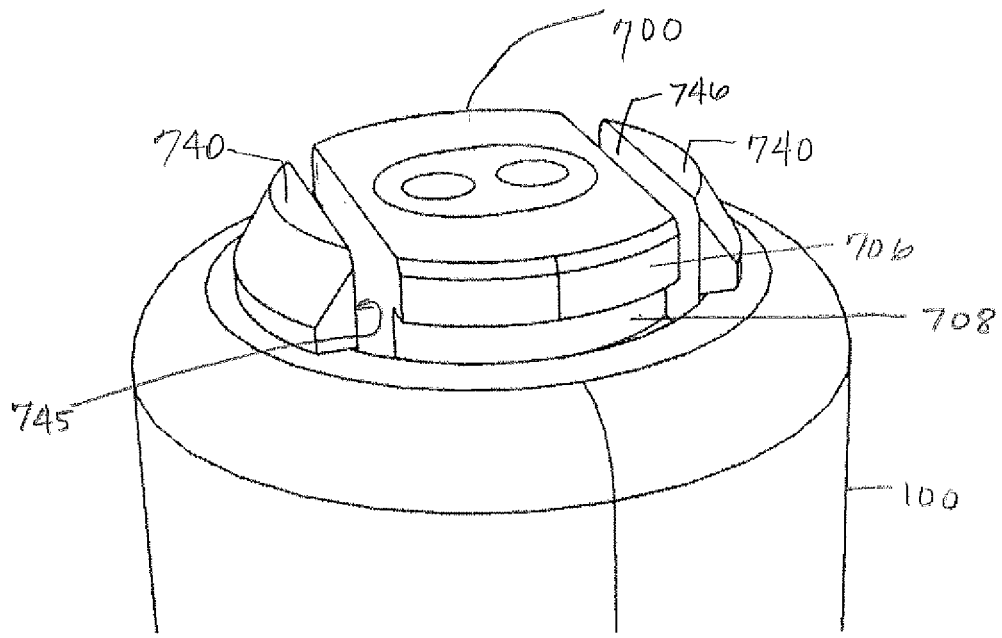
FIG. 19 illustrates a partial perspective view of an initiator according to another implementation assembled with the housing of FIG. 1.

The head portion 402 of the initiator 400 also includes two or more arms 440 that are coupled to the head wall 406. Each arm 440 has a proximal end 448 coupled to the head wall 406 and a distal end 442 that is free and is biased radially outwardly from the head wall 406. The head wall 406 and a radially inner surface 445 of each arm 440 define a space (or cavity) 446. The distal end 442 of the arm 440 can be urged radially inward into the space 446 to engage the arm 440 through the opening 104 defined by the end wall 102 of the housing 100. The proximal end 448 of each arm 440 is coupled to the head wall 406 at a first axial location along the head wall 406, and the distal end 442 of each arm 440 is disposed radially adjacent a second axial location along the head wall 406. The second axial location is closer to the head face 404 than the first axial location. And, in some implementations, the distal end 442 of each arm 440 is within the same plane as the head face 404 when no radially inward force is being applied to the arm 440. In the implementation shown in FIGS. 8-10, the head portion 402 includes three arms 440 that are equi-spaced about a circumference of the head wall 406. However, in other implementations, for example, the head portion may have two or more arms that are circumferentially spaced apart about the head wall. For example, FIGS. 19-21 illustrate an initiator 700 that includes two arms 740 that are diametrically opposed about the head wall 706.

Referring back to FIGS. 8-11, each arm 440 defines a clip surface 444 on a radially outward surface of the arm 440 adjacent the distal end 442 thereof, and the clip surface 444 engages an exterior surface of the end wall 102 of the housing adjacent the opening 104, which prevents the initiator 400 from being removed from the opening 104 or sliding axially within the housing 100.

Figure 9:
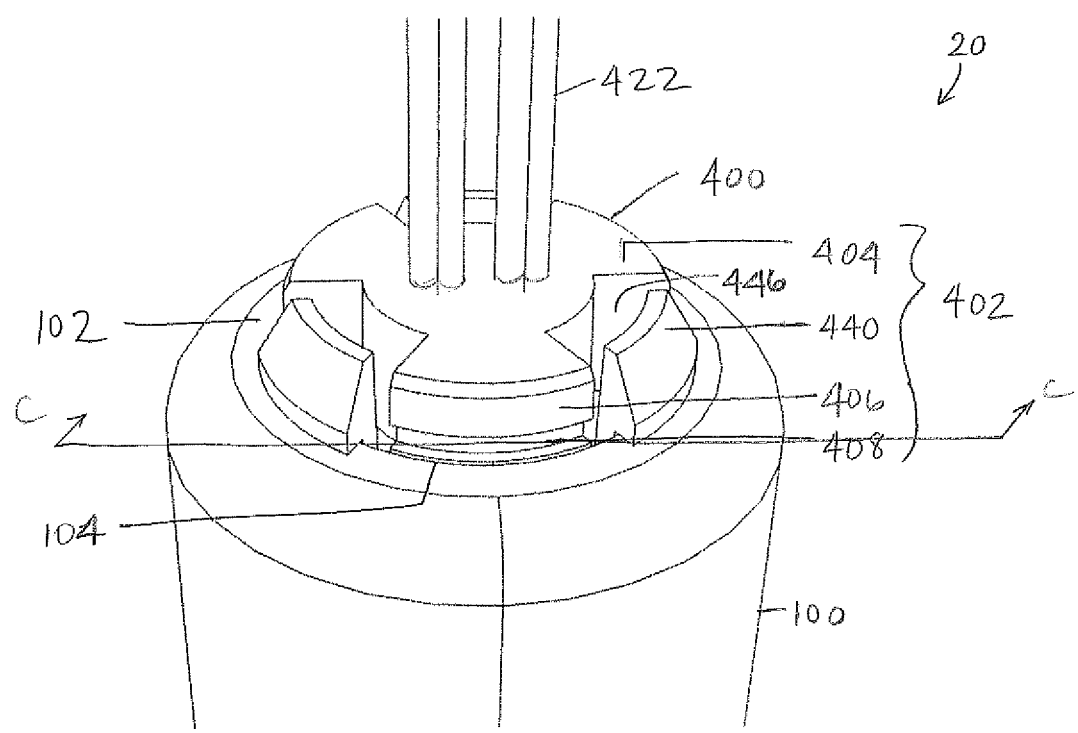
FIG. 9 illustrates a partial perspective view of the housing and the initiator shown in FIG. 8.

As shown in FIG. 9, the head wall 406 also defines a groove 408 that extends radially inwardly from the head wall 406 and extends circumferentially between adjacent arms 440 Sidewalls 408a, 408b of each groove 408 lie within planes that are perpendicular to a central axis A-A extending through the head face 404 of the initiator 400 and an opposite and spaced apart end of the initiator 400. And, a groove floor 408c of each groove 408 is spaced radially inwardly from the head wall 406. In this implementation, the at least one groove comprises three grooves 408 that extend radially inwardly from the head wall 406 and circumferentially between adjacent arms 440. However, in other implementations, the at least one groove may comprise one or more grooves that extend circumferentially around the head wall of the initiator.

To install the initiator 400 into the housing 100, the initiator 400 is fed through the distal end opening of the housing 100 (not shown) such that the head portion 402 enters the housing 100 first. The initiator 400 is slid through the housing 100 until the head face 404 and a portion of the head wall 406 extend through the opening 104 of the housing 100. In addition, the distal ends 442 of each arm 440 are further urged through the opening 104 defined by the end wall 102 of the housing 100. As each arm 440 is urged through the opening 104, the distal end 442 of each arm 440 is urged radially inwardly into the space 446, allowing the distal end 442 of each arm 440 and the head face 404 to pass through the opening 104. After passing through the opening 104, the distal end 442 of each arm 440 is allowed to move radially away from the head wall 406.

Figure 10:
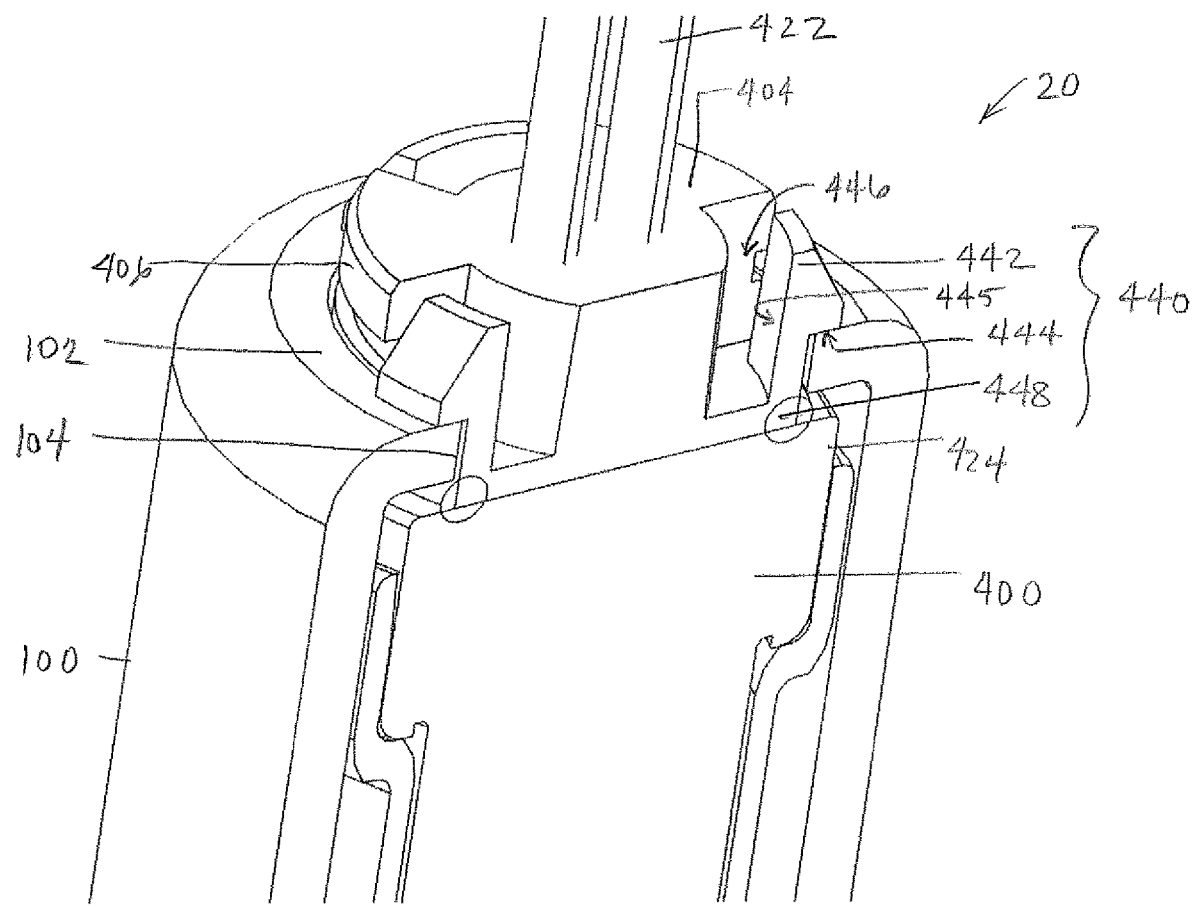
FIG. 10 illustrates a partial cross sectional view of the housing and initiator shown in FIG. 9 as viewed from the C-C plane.

The outer diameter of the head wall 406 is less than an inner diameter of the opening 104 to allow the head wall 406 to pass through the opening 104. And, the outer diameter of the arms 440 in a radially inward compressed position is less than the inner diameter of the opening, but the outer diameter of the arms 440 is more than the inner diameter of the opening 104 when the arms are not compressed radially inwardly. However, the outer diameter of a collar 424 of the initiator 400 is greater than the inner diameter of the opening 104 and prevents the initiator 400 from passing fully through the opening 104. The collar 424, which is shown in FIG. 10, engages the axially inward facing surface of the end wall 102 of the housing 100. The collar 424 is disposed axially between the proximal ends 448 of the arms 440 and an actuation end of the initiator 400 that is axially opposite the head face 404 of the head portion 402.

To prevent the two or more arms 440 from being urged radially inward after being assembled within the opening 104 of the housing 100, a cap may be disposed around the portion of the head portion 402 that extends externally from the housing 100. The caps may include locking caps that extend around at least a portion of the head wall 406 or drop protection caps that extend around the head wall 406 and head face 404 and prevent damage to the electrical connectors (e.g., if the actuator assembly is dropped).

Figure 17:
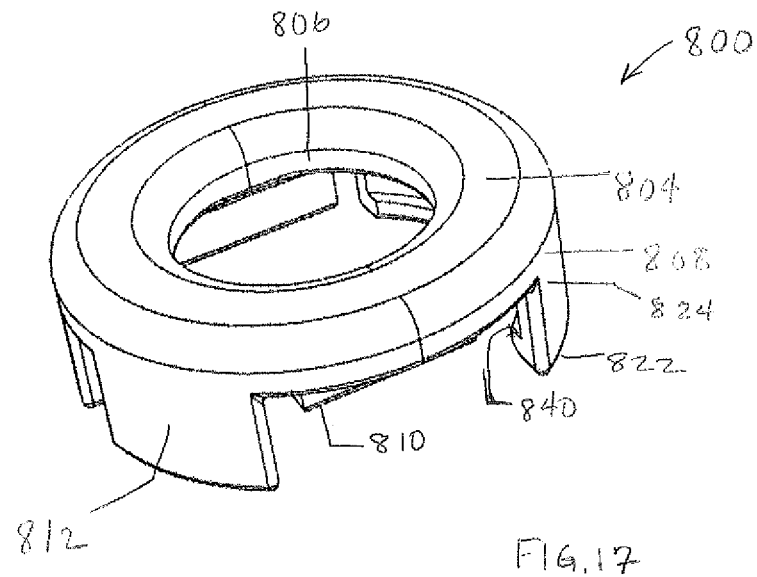
FIG. 17 illustrates a perspective view of a cap according to another implementation.
Figure 18:
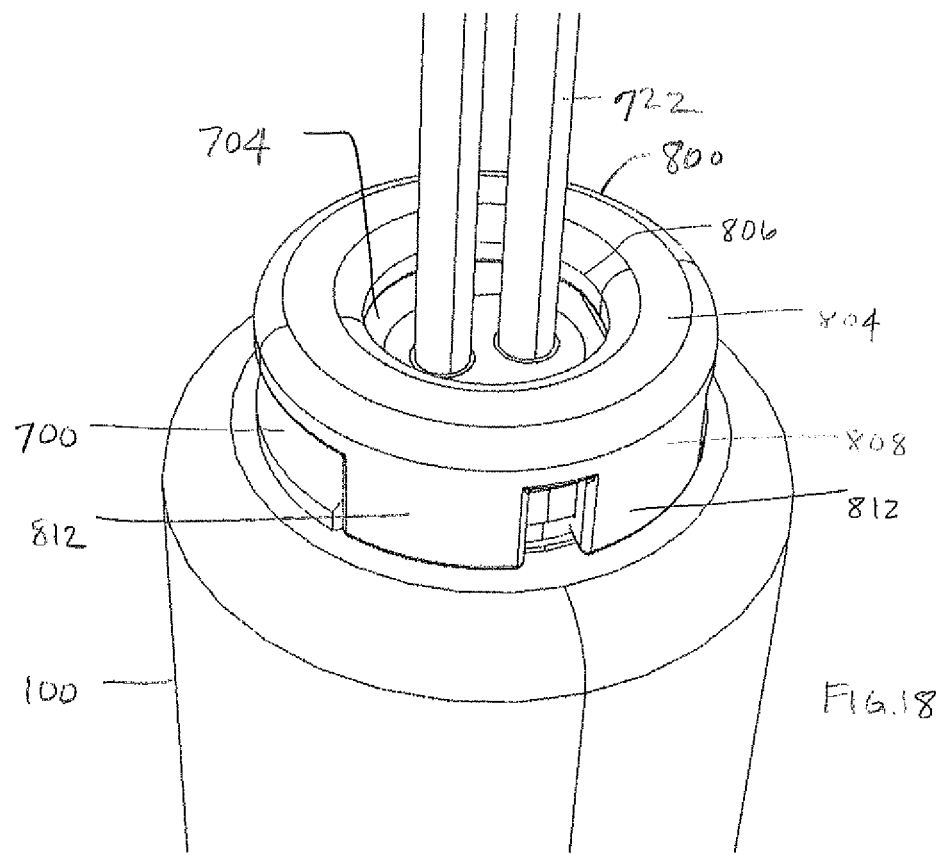
FIG. 18 illustrates a partial perspective view of the cap in FIG. 17 assembled with the initiator and housing shown in FIG. 19.

For example, a locking cap 800 is shown in FIGS. 17-18 and includes an end wall 804 defining an opening 806 through which electrical connectors 722 extending from the head face 704 of the initiator 700 can extend, two or more inner tabs 810 that extend axially from (or adjacent to) an edge of the opening 806 in the end wall 804, and two or more outer tabs 812 that extend axially from (or adjacent to) an outer edge of a sidewall 808 of the locking cap 800. The sidewall 808 extends axially from a perimeter of the end wall 804. A distal end of each inner tab 810 engages the space 746 between the head wall 706 and the radially inner surface 745 of each respective arm 740 to prevent the arm 740 from being urged radially inwardly. And, each outer tab 812 defines a clip surface 840 on a radially inward surface of the outer tab 812 adjacent a distal end 822 of the outer tab 812, wherein a proximal end 824 of the outer tab 812 is coupled to the end wall 804 of the locking cap 800. The distal ends 822 of the outer tabs 812 are urged radially outwardly as the locking cap 800 is engaged over the head wall 706, and the clip surfaces 840, which are biased inwardly, engage the groove 708 defined in the head wall 706 between the arms 740 of the initiator 700 to secure the locking cap 800 to the initiator 700. As shown in FIGS. 17 and 18, each of the inner tabs 810 and the outer tabs 812 are circumferentially spaced apart from each other, and the inner and outer tabs 810, 812 are spaced alternately circumferentially about the sidewall 808. In other implementations, the locking cap may include an inner wall instead of individual inner tabs.

Figure 11:
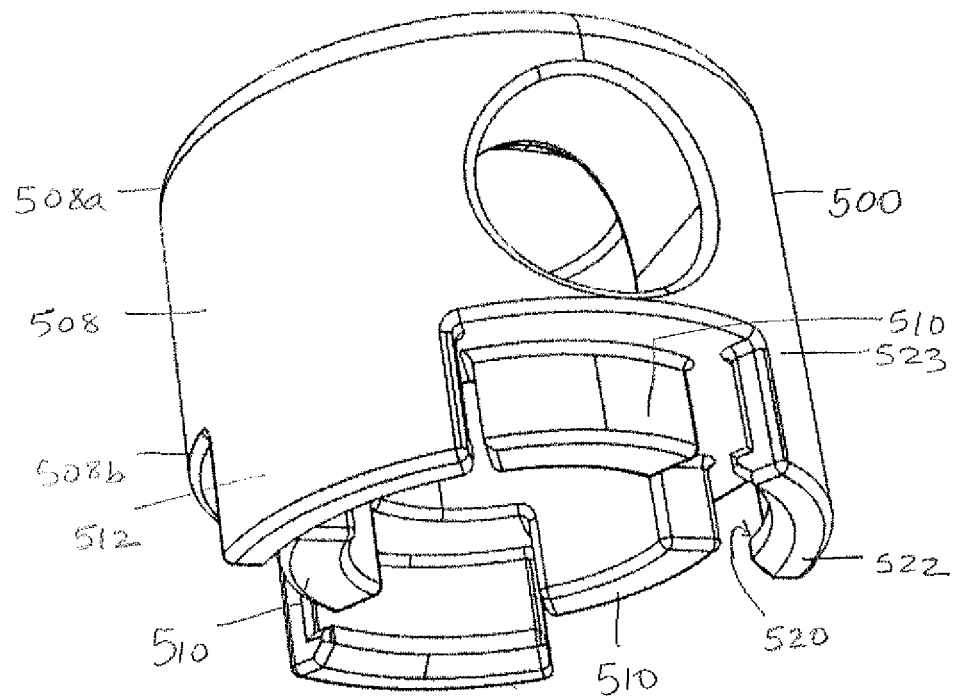
FIG. 11 illustrates a perspective view of the cap shown in FIG. 8.
Figure 12:
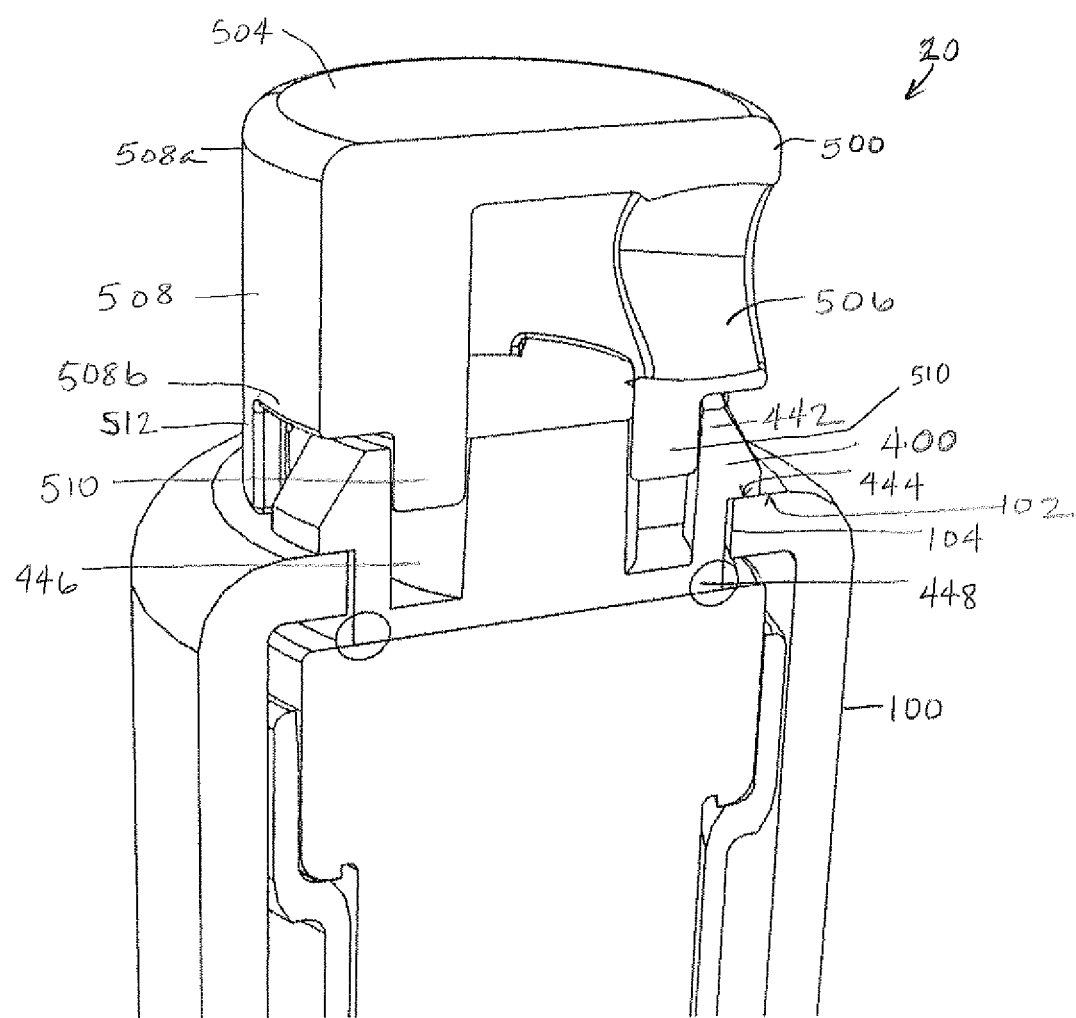
FIG. 12 illustrates a partial cross sectional view of the cap shown in FIG. 11 and the assembly shown in FIG. 9 as viewed from the C-C plane.
Figure 13:
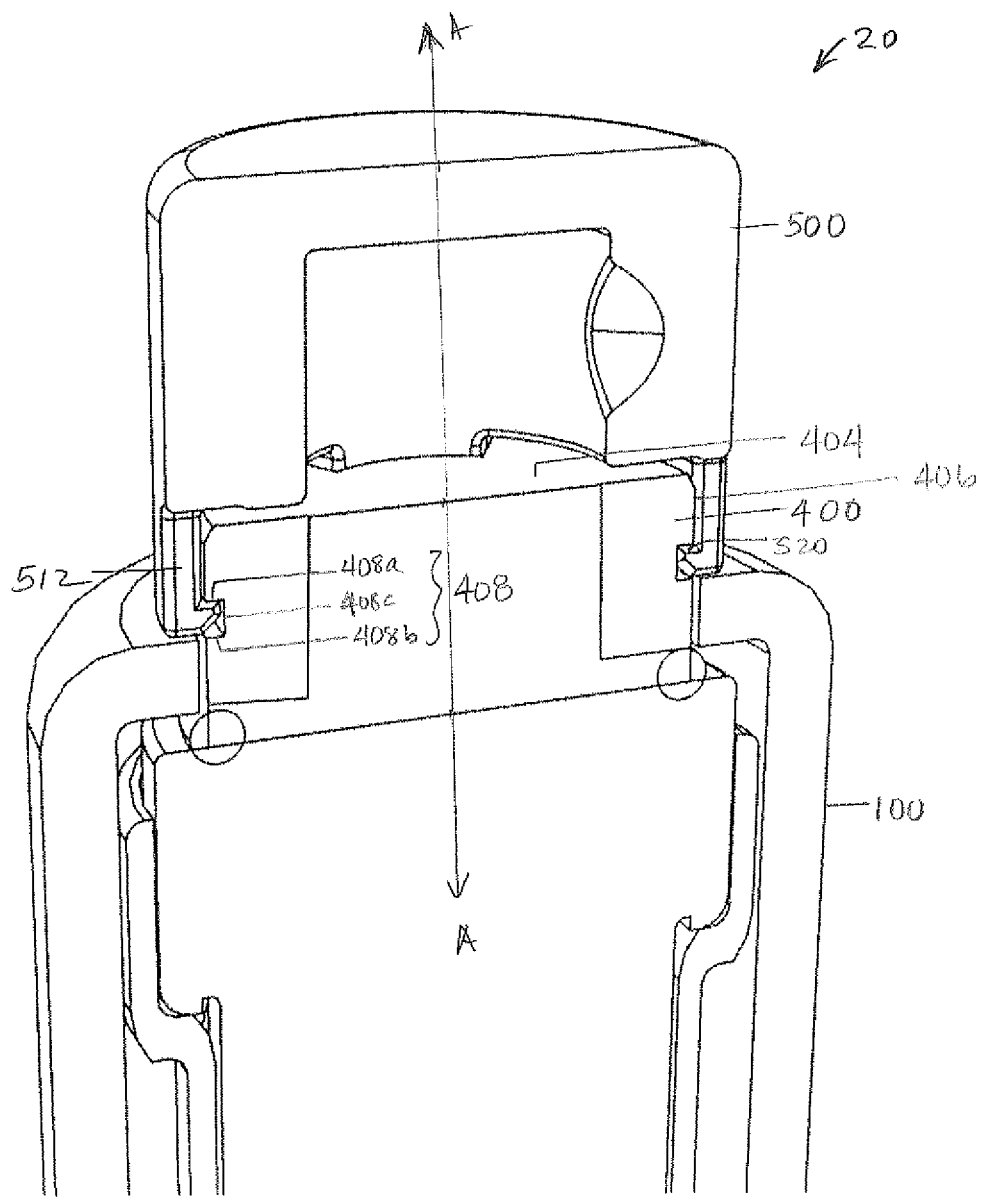
FIG. 13 illustrates a partial cross sectional view of the cap shown in FIG. 8 as viewed from the D-D plane.
Figure 14:
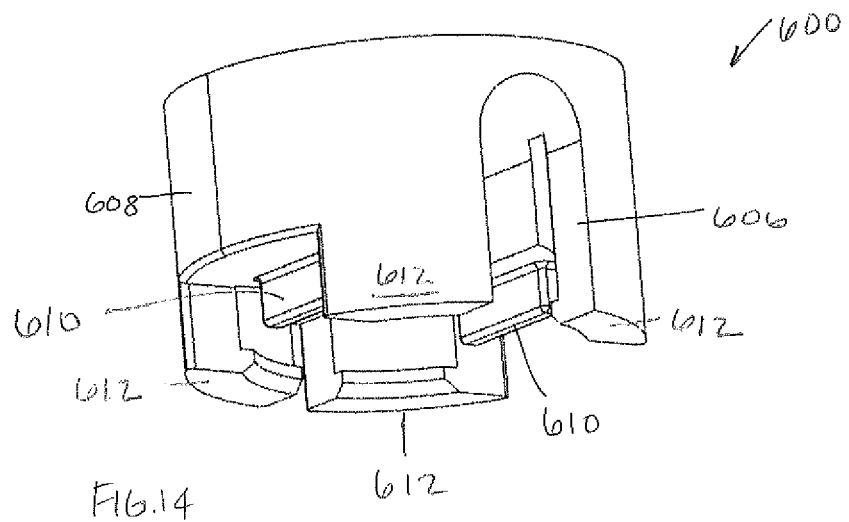
FIG. 14 illustrates a bottom perspective view of a cap according to another implementation.
Figure 15:
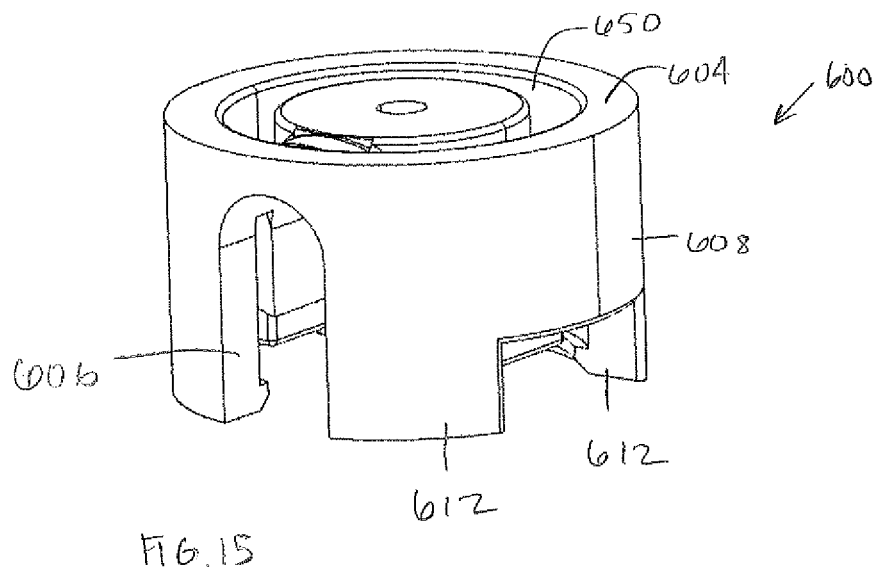
FIG. 15 illustrates a top perspective view of the cap shown in FIG. 14.
Figure 16:
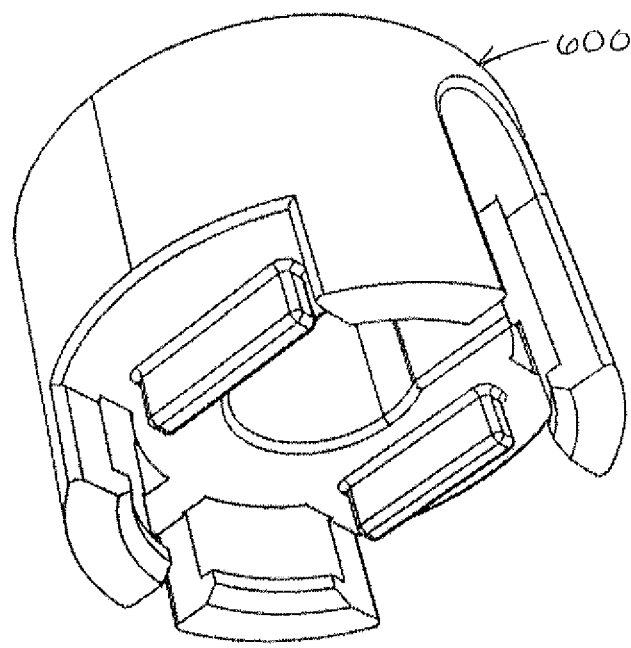
FIG. 16 illustrates another bottom perspective view of the cap shown in FIG. 14.

FIGS. 8 and 11-13 illustrate a drop protection cap 500 according to one implementation, and FIGS. 14-16 illustrate a drop protection cap 600 according to another implementation. The cap 500 shown in FIGS. 8 and 11-13 is shown coupled to the initiator 400 described above in relation to FIGS. 8-10. The cap 500 has a cap end face 504 and a cap wall 508 that extends axially from a perimeter of the cap end face 504. The cap wall 508 defines an opening 506 through which electrical connectors 422 extending from the head face 404 of the initiator 400 can extend. The opening 506 is circular shaped. A first end 508a of the cap wall 508 is spaced apart and opposite the second end 508b of the cap wall 508, and the first end 508a of the cap wall 508 is coupled to the cap end face 504. The cap 500 further includes outer tabs 512 that each include a proximal end 523 and a distal end 522. Each outer tab 512 defines a clip surface 520 on a radially inward surface of the outer tab 512 adjacent the distal end 522 of the outer tab 512. The proximal end 523 of the outer tab 512 is coupled to the second end 508b of the cap wall 508 of the drop protection cap 500, and the distal end 522 is opposite and spaced apart from the proximal end 523.

In the implementation shown, the cap 500 includes three outer tabs 512 and three inner tabs 510 that are equi-spaced circumferentially around the cap wall 508. However, in other implementations, the cap may include two or more outer tabs and/or two or more inner tabs that are circumferentially spaced apart around the cap wall. For example, the implementation of the cap 600 shown in FIGS. 14-16 includes four outer tabs 612 and two inner tabs 610 that are circumferentially spaced apart about the cap wall 608.

In this implementation, the opening 506 is circular shaped. However, in other implementations, the shape of the opening can be any closed or open shape. For example, in the implementation shown in FIGS. 14-16, the cap wall 608 and the edges of adjacent tabs 612 define a U-shaped opening 606.

In addition, the end face 504 of the cap 500 shown in FIGS. 8 and 11-13 is solid. However, in other implementations, the end face of the cap may define openings or channels. For example, in the implementation shown in FIGS. 14-16, the end face 604 of the cap 600 defines a channel 650. The channel 650 reduces the amount of material used to form the cap 600 and prevents warping of the cap 600 during and/or after molding by providing less variation in the volume of various portions of the cap 600.

To assembly the cap 500 to the initiator 400, the distal ends 522 of the outer tabs 512 are urged axially toward the head face 404 of the initiator. As the cap 500 is slid over the head portion 402 of the initiator 400, the distal ends 522 are urged radially outwardly, and the clip surfaces 520 are biased radially inwardly to engage the grooves 408 defined in the head wall 406 between the arms 440 of the initiator 400 to secure the cap 500 to the initiator 400. The distal ends 522 of the outer tabs 512 of the drop protection cap 500 abut the exterior surface of the end wall 102 of the housing 100 to which the initiator 400 is coupled, which allows any forces incident on the drop protection cap 500 to be transferred to the housing 100, instead of to the initiator 400.

As used herein, "radial" or "radially" and "circumferential" or "circumferentially", as used herein, refer to directions relative to a central axis. "Axially" refers to the directions along the central axis. These terms should not be used to limit the underlying structures being described as cylindrical or circular. Instead, "radially inward" or "radially outward" refers to a direction in a plane that is perpendicular to the central axis extending through a structure, and "circumferential" and "circumferentially" refer to a direction around the structure (e.g., around its perimeter). In addition, the housing, initiator, and end walls of the caps are shown as cylindrical or generally circular, but in other implementations, these features may have other suitable shapes.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

A number of implementations have been described. Nevertheless, it will be understood that various modifications may be made without departing from the spirit and scope of the claims. Accordingly, other implementations are within the scope of the following claims.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

The invention claimed is:

1. An actuator assembly comprising:
a housing having an end wall, the end wall defining an opening;
an initiator comprising a head portion, the head portion defining at least one groove that extends circumferentially around at least a portion of the head portion, wherein the initiator comprises one or more electrical connectors extending therefrom; and
a cap having an end face, a wall that extends from the end face in a first axial direction, a first arm, and a second arm, each arm having a proximal end coupled to the wall and a distal end that is free and spaced apart from the proximal end, the arms being biased radially inward,
wherein at least a portion of the arms slidably engage the at least one groove defined by the head portion, and a portion of the head portion extending axially outside of the housing is disposed within a cavity defined by the end face and wall of the cap, and
wherein the cap defines an opening, and the one or more electrical connectors extend directly and continuously from the initiator head portion, through the cavity and out of the opening of the cap.

2. The assembly of claim 1, wherein the at least one groove comprises a first groove and a second groove, the first and second grooves being diametrically opposed to each other on the head portion.

3. The assembly of claim 2, wherein:
the first groove defines a first step within the first groove and the second groove defines a second step within the second groove, the steps being spaced apart from each other circumferentially, and
a distal end of each arm comprises a clip surface that extends radially inwardly, the clip surface of the first arm engages the first step and the clip surface of the second arm engages the second step, preventing the arms from being slidably disengaged from the grooves.

4. The assembly of claim 1, wherein the arms extend circumferentially from the wall of the cap such that the proximal and distal ends of each arm are circumferentially spaced apart, and the first and second arms are circumferentially spaced apart.

5. The assembly of claim 4, wherein a depth of each arm tapers adjacent a distal end thereof, the depth being measured in an axial direction, and wherein the arms pull the initiator axially toward the end wall of the housing to compress a resilient seal disposed between a flange of the initiator and the end wall when the arms are slid through the at least one groove.

6. The assembly of claim 1, wherein the arms extend axially from the wall of the cap such that the proximal and distal ends of each arm are axially spaced apart, and the first and second arms are circumferentially spaced apart.

7. The assembly of claim 6, wherein the head portion of the initiator comprises a head face and a head wall that extends axially from the head face, the at least one groove being defined in the head wall, the head portion further comprises at least two initiator arms, each initiator arm having a proximal end coupled to the head wall and a distal end that is free and radially spaced apart from the head wall, the proximal ends of each initiator arm being axially spaced apart from the head face, the initiator arms being biased radially outwardly, the proximal ends of the initiator arms being spaced apart from each other, the one or more grooves extending circumferentially between the proximal ends of the initiator arms, and the distal end of the each initiator arm comprising a clip surface that extends radially outwardly from each initiator arm, the clip surfaces extending through the opening of the housing and engaging the end wall of the housing.

8. The assembly of claim 7, wherein the cap further comprises at least one inner tab, the inner tab being spaced radially inwardly from the wall of the cap, and a distal end of each inner tab extending into a space defined between the head wall of the initiator and a respective initiator arm to prevent radially inward movement of the initiator arms.

9. The assembly of claim 7, wherein the at least two initiator arms comprise first, second, and third initiator arms that are spaced apart circumferentially.

10. The assembly of claim 7, wherein the end face of the cap defines the opening of the cap.

11. The assembly of claim 7, wherein the wall of the cap defines the opening of the cap.

12. The assembly of claim 1, wherein the at least one groove has a groove floor, each arm of the cap has an inner radial surface, and at least a portion of the inner radial surface engages the groove floor of the at least one groove.

13. The assembly of claim 12, wherein the at least one groove has a first sidewall and a second sidewall that extends radially outwardly from the groove floor, the first and second sidewalls facing each other axially.

14. The assembly of claim 13, wherein the first sidewall is disposed outside of the housing and the second sidewall is disposed inside of the housing.

15. The assembly of claim 1, wherein the wall of the cap defines the opening of the cap.

16. The assembly of claim 1, wherein an axial end surface of the wall of the cap abuts the end wall of the housing when the arms are engaged in the grooves.

17. A method of assembling an actuator comprising:
sliding an initiator through a first opening of a housing and toward a second opening of the housing, the first opening and the second opening being axially spaced apart, the initiator comprising a head portion defining at least one groove that extends circumferentially around at least a portion of the head portion, wherein the initiator comprises one or more electrical connectors extending therefrom, wherein at least a portion of the head portion extends through the second opening of the housing; and
sliding first and second arms of a cap into the at least one groove of the initiator, the cap having an end face, a wall that extends from the end face in a first axial direction, wherein each arm has a proximal end coupled to the wall and a distal end that is free and spaced apart from the proximal end, the arms being biased radially inwardly, wherein the portion of the head portion of the initiator that extends axially outside of the housing is disposed within a cavity defined by the end face and wall of the cap, and wherein the cap defines an opening, and the one or more electrical connectors extend directly and continuously from the initiator head portion, through the cavity and out of the opening of the cap.

18. The method of claim 17, wherein the opening is defined by the wall of the cap.

19. The method of claim 17, wherein the arms extend circumferentially from the wall of the cap such that the proximal and distal ends of each arm are circumferentially spaced apart, and the first and second arms are circumferentially spaced apart.

20. The method of claim 17, wherein the arms extend axially from the wall of the cap such that the proximal and distal ends of each arm are axially spaced apart, and the first and second arms are circumferentially spaced apart.

* * * * *